US010578046B2

(12) United States Patent
Satake et al.

(10) Patent No.: US 10,578,046 B2
(45) Date of Patent: Mar. 3, 2020

(54) FUEL INJECTION CONTROL DEVICE

(71) Applicants: TOYOTA JIDOSHA KABUSHIKI KAISHA, Aichi (JP); DENSO CORPORATION, Aichi (JP)

(72) Inventors: Nobuyuki Satake, Kariya (JP); Tomohiro Nakano, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/092,831

(22) PCT Filed: Apr. 7, 2017

(86) PCT No.: PCT/JP2017/014476
§ 371 (c)(1),
(2) Date: Oct. 11, 2018

(87) PCT Pub. No.: WO2017/191733
PCT Pub. Date: Nov. 9, 2017

(65) Prior Publication Data
US 2019/0120167 A1    Apr. 25, 2019

(30) Foreign Application Priority Data
May 6, 2016 (JP) ................................. 2016-093320

(51) Int. Cl.
*F02D 41/34* (2006.01)
*F02D 41/24* (2006.01)
(Continued)

(52) U.S. Cl.
CPC ........... *F02D 41/345* (2013.01); *F02D 41/20* (2013.01); *F02D 41/247* (2013.01);
(Continued)

(58) Field of Classification Search
CPC .... F02D 41/34; F02D 41/345; F02D 41/3094; F02D 2041/389; F02M 51/061
See application file for complete search history.

(56) References Cited

U.S. PATENT DOCUMENTS

2014/0123960 A1    5/2014  Imai et al.
2014/0238354 A1    8/2014  Imai
(Continued)

FOREIGN PATENT DOCUMENTS

WO    2013/191267 A1    12/2013
WO    2017/191728 A1    11/2017
(Continued)

OTHER PUBLICATIONS

Jun. 20, 2017 International Search Report issued in International Patent Application No. PCT/JP2017/014476.
(Continued)

*Primary Examiner* — Hieu T Vo
(74) *Attorney, Agent, or Firm* — Oliff PLC

(57) ABSTRACT

A fuel injection control device has a detection unit, a correction value calculation unit, and a conduction time calculation unit. The detection unit detects a current increase speed that is a speed of increasing an electric current flowing in an electromagnetic coil in accordance with the start of conducting the electromagnetic coil during partial lift injection in which a valve body starts valve closing operation before the valve body reaches a maximum valve opening position after the valve body starts valve opening operation. The correction value calculation unit calculates a correction value for a requested injection quantity on the basis of the detected current increase speed. The conduction time calculation unit calculates a conduction time of the electro-
(Continued)

magnetic coil during the partial lift injection on the basis of the requested injection quantity corrected by the correction value.

5 Claims, 9 Drawing Sheets

(51) Int. Cl.
*F02D 41/20* (2006.01)
*F02D 41/30* (2006.01)
*F02M 51/06* (2006.01)
*F02D 41/38* (2006.01)

(52) U.S. Cl.
CPC ....... *F02D 41/3094* (2013.01); *F02M 51/061* (2013.01); *F02D 2041/2055* (2013.01); *F02D 2041/2058* (2013.01); *F02D 2041/389* (2013.01); *F02D 2200/0614* (2013.01); *Y02T 10/44* (2013.01)

(56) References Cited

U.S. PATENT DOCUMENTS

| | | |
|---|---|---|
| 2016/0108847 A1 | 4/2016 | Nakano et al. |
| 2016/0237935 A1 | 8/2016 | Tanaka et al. |
| 2016/0245211 A1 | 8/2016 | Katsurahara et al. |
| 2016/0298565 A1 | 10/2016 | Nagatomo et al. |
| 2017/0009689 A1 | 1/2017 | Imai |
| 2017/0226950 A1 | 8/2017 | Tanaka |

FOREIGN PATENT DOCUMENTS

| | | |
|---|---|---|
| WO | 2017/191729 A1 | 11/2017 |
| WO | 2017/191730 A1 | 11/2017 |
| WO | 2017/191731 A1 | 11/2017 |
| WO | 2017/191732 A1 | 11/2017 |

OTHER PUBLICATIONS

Jun. 20, 2017 Written Opinion issued in International Patent Application No. PCT/JP2017/014476.
May 16, 2019 Office Action issued in European Patent Application No. 17792666.4.

FUEL INJECTION CONTROL DEVICE

CROSS REFERENCE TO RELATED APPLICATION

This application is based on Japanese Patent Application No. 2016-93320 filed on May 6, 2016, the disclosure of which is incorporated herein by reference.

TECHNICAL FIELD

The present disclosure relates to a fuel injection control device to control an injection quantity of a fuel injected through a fuel injection valve.

BACKGROUND ART

In Patent Literature 1, a fuel injection valve to inject a fuel by operating a valve body for valve opening by an electromagnetic force caused by conduction of an electromagnetic coil is disclosed. Further, a fuel injection control device to control a valve opening time of a valve body by controlling a time for energizing the electromagnetic coil and thus control an injection quantity injected per one time valve opening of the valve body is disclosed. A conduction time is set at a time corresponding to an injection quantity that is requested (requested injection quantity).

PRIOR ART LITERATURES

Patent Literature

Patent Literature 1: JP2015-96720A

SUMMARY OF INVENTION

Meanwhile, in recent years, the development of partial lift injection (refer to Patent Literature 1) in which a valve body starts valve closing operation before the valve body reaches a maximum valve opening position after the valve body starts valve opening operation advances. In the partial lift injection, since a conduction time is extremely short, a period of time when valve opening operation cannot start and a fuel is not injected (namely invalid injection period) because an electromagnetic force is small in spite of the fact that the period is immediately after the start of the conduction and during the conduction accounts for a large proportion of the conduction time. Consequently, in the partial lift injection, an injection quantity varies largely only because an invalid injection period varies slightly.

When the temperature of an electromagnetic coil varies however, the electric resistance of the electromagnetic coil varies and hence the speed of increasing the electric current flowing in the electromagnetic coil (coil current) immediately after the start of conduction also varies. As a result, an invalid injection period varies, correspondence between a requested injection quantity and a conduction time (namely injection characteristic) varies undesirably, and a fuel injection quantity in partial lift injection cannot be controlled with a high degree of accuracy.

An object of the present disclosure is to provide a fuel injection control device that attempts to control a fuel injection quantity in partial lift injection with a high degree of accuracy.

According to an aspect of the present disclosure, the fuel injection control device is applied to a fuel injection valve including a valve body to open and close an injection hole to inject a fuel and an electric actuator that has an electromagnetic coil and a movable core to move by being attracted by an electromagnetic force generated by conducting the electromagnetic coil and operates the valve body for valve opening, controls a valve opening time of the valve body by controlling a conduction time of the electromagnetic coil and thus control an injection quantity injected per one time valve opening of the valve body. The fuel injection control device includes a detection unit to detect a current increase speed that is a speed of increasing an electric current flowing in the electromagnetic coil in accordance with the start of conducting the electromagnetic coil during partial lift injection in which the valve body starts valve closing operation before the valve body reaches a maximum valve opening position after the valve body starts valve opening operation, a correction value calculation unit to calculate a correction value for a requested injection quantity that is the injection quantity required on the basis of the current increase speed detected by the detection unit, and a conduction time calculation unit to calculate the conduction time of the electromagnetic coil during the partial lift injection on the basis of the requested injection quantity corrected by the correction value.

Meanwhile, a change of an injection characteristic responding to a temperature has a high correlation with a speed at which an electric current flowing in an electromagnetic coil increases in accordance with the start of conducting the electromagnetic coil. According to the above disclosure considering this point, during partial lift injection, a speed at which an electric current flowing in an electromagnetic coil increases is detected, a correction value for a requested injection quantity is calculated on the basis of the detected current increase speed, and the requested injection quantity is corrected by the correction value. As a result, during the partial lift injection, since an electromagnetic coil can be controlled by a conduction time suitable for an injection characteristic varying in response to a temperature, a fuel injection quantity in the partial lift injection can be controlled with a high degree of accuracy.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
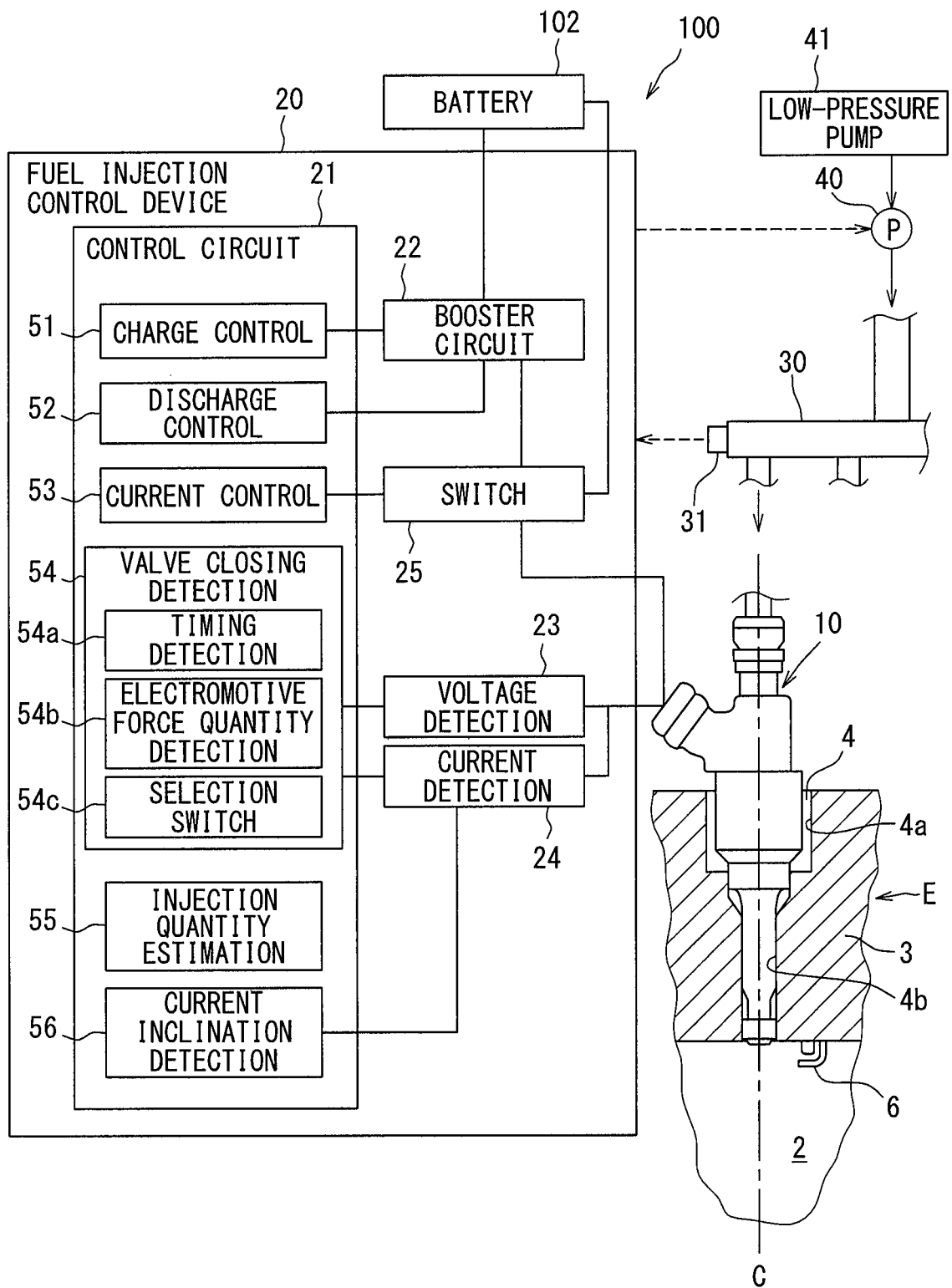
FIG. 1 is a view showing a fuel injection system according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration.

(First Embodiment)

A first embodiment according to the present disclosure is explained in reference to FIGS. 1 to 10. A fuel injection system 100 shown in FIG. 1 includes a plurality of fuel injection valves 10 and a fuel injection control device 20. The fuel injection control device 20 controls the opening and closing of the fuel injection valves 10 and controls fuel injection into a combustion chamber 2 of an internal combustion engine E. The fuel injection valves 10: are installed in an internal combustion engine E of an ignition type, for example a gasoline engine; and inject a fuel directly into a plurality of combustion chambers 2 of the internal combustion engine E respectively. A mounting hole 4 penetrating concentrically with an axis C of a cylinder is formed in a cylinder head 3 constituting the combustion chamber 2. A fuel injection valve 10 is inserted into and fixed to the mounting hole 4 so that the tip may be exposed into the combustion chamber 2.

A fuel supplied to the fuel injection valve 10 is stored in a fuel tank not shown in the figure. The fuel in the fuel tank is pumped up by a low-pressure pump 41, the fuel pressure is raised by a high-pressure pump 40, and the fuel is sent to a delivery pipe 30. The high-pressure fuel in the delivery pipe 30 is distributed and supplied to the fuel injection valve 10 of each cylinder. A spark plug 6 is attached to a position of the cylinder head 3 facing the combustion chamber 2. Further, the spark plug 6 is arranged in a vicinity of the tip of the fuel injection valve 10.

Figure 2:
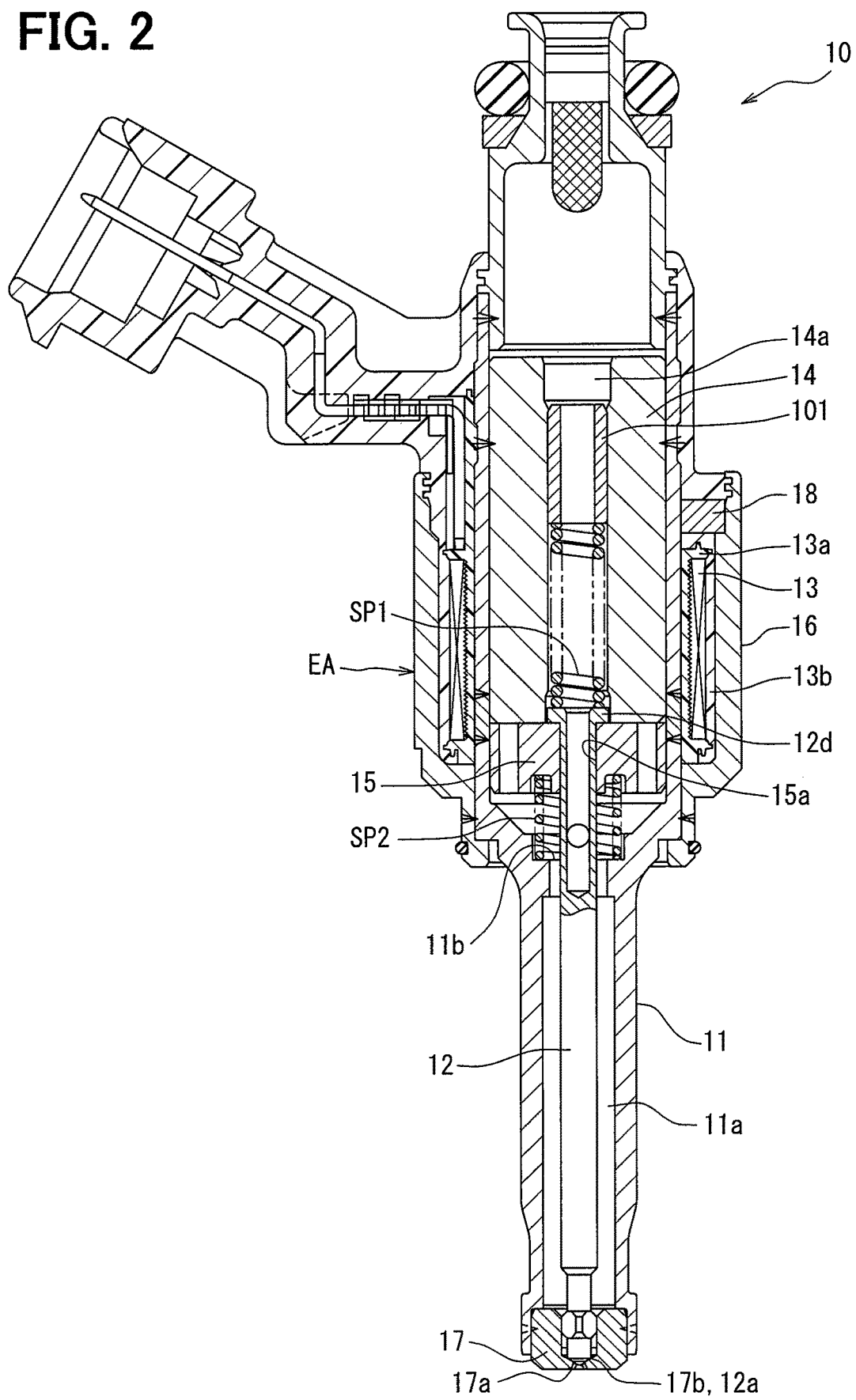
FIG. 2 is a sectional view showing a fuel injection valve.

The configuration of the fuel injection valve 10 is explained hereunder in reference to FIG. 2. As shown in FIG. 2, the fuel injection valve 10 includes a body 11, a valve body 12, an electromagnetic coil 13, a stator core 14, a movable core 15, and a housing 16. The body 11 comprises a magnetic material. A fuel passage 11a is formed in the interior of the body 11.

Further, the valve body 12 is contained in the interior of the body 11. The valve body 12 comprises a metal material and is formed cylindrically as a whole. The valve body 12 can be displaced reciprocally in an axial direction in the interior of the body 11. The body 11 is configured so as to have an injection hole body 17 in which a valve seat 17b where the valve body 12 is seated and an injection hole 17a to inject a fuel are formed at the tip part. The injection hole 17a includes a plurality of holes formed radially from the inside toward the outside of the body 11. A fuel of a high pressure is injected into the combustion chamber 2 through the injection hole 17a.

The main body part of the valve body 12 has a columnar shape. The tip part of the valve body 12 has a conical shape extending from the tip of the main body part on the side of the injection hole 17a toward the injection hole 17a. The part, which is seated on the valve seat 17b, of the valve body 12 is a seat surface 12a. The seat surface 12a is formed at the tip part of the valve body 12.

When the valve body 12 is operated for valve closing so as to seat the seat surface 12a on the valve seat 17b, the fuel passage 11a is closed and fuel injection from the injection hole 17a is stopped. When the valve body 12 is operated for valve opening so as to separate the seat surface 12a from the valve seat 17b, the fuel passage 11a is open and a fuel is injected through the injection hole 17a.

The electromagnetic coil 13 is an actuator and gives a magnetic attraction force to the movable core 15 in a valve opening direction. The electromagnetic coil 13 is configured by being wound around a resin-made bobbin 13a and is sealed by the bobbin 13a and a resin material 13b. In other words, a coil body of a cylindrical shape includes the electromagnetic coil 13, the bobbin 13a, and the resin material 13b. The bobbin 13a is inserted over the outer peripheral surface of the body 11. The stator core 14 comprises a magnetic material and is formed cylindrically and is fixed to the body 11. A fuel passage 14a is formed in the interior of the cylinder of the stator core 14.

Further, the outer peripheral surface of the resin material 13b to seal the electromagnetic coil 13 is covered with the housing 16. The housing 16 comprises a metallic magnetic material and is formed cylindrically. A lid member 18 comprising a metallic magnetic material is attached to an opening end part of the housing 16. Consequently, the coil body is surrounded by the body 11, the housing 16, and the lid member 18.

The movable core 15 is a mover and is retained by the valve body 12 relatively displaceably in the direction of driving the valve body 12. The movable core 15 comprises a metallic magnetic material, is formed discoidally, and is inserted over the inner peripheral surface of the body 11. The body 11, the valve body 12, the coil body, the stator core 14, the movable core 15, and the housing 16 are arranged so that the center lines of them may coincide with each other. Then the movable core 15 is arranged on the side of the stator core 14 closer to the injection hole 17a and faces the stator core 14 in the manner of having a prescribed gap from the stator core 14 when the electromagnetic coil 13 is not conducted.

The body 11, the housing 16, the lid member 18, and the stator core 14, which surround the coil body: comprise magnetic materials as stated earlier; and hence form a magnetic circuit acting as a pathway of a magnetic flux generated when the drive coil 13 is conducted. Components such as the stator core 14, the movable core 15, the electromagnetic coil 13, and the like correspond to an electric actuator EA to operate the valve body 12 for valve opening.

As shown in FIG. 1, the outer peripheral surface of a part of the body 11 located on the side closer to the injection hole 17a than the housing 16 is in contact with an inner peripheral surface 4b of the mounting hole 4 on the lower side. Further, the outer peripheral surface of the housing 16 forms a gap from an inner peripheral surface 4a of the mounting hole 4 on the upper side.

A through hole 15a is formed in the movable core 15 and, by inserting the valve body 12 into the through hole 15a, the valve body 12 is assembled to the movable core 15 slidably and relatively movably. A locking part 12d formed by expanding the diameter from the main body part is formed at an end part, which is located on the upper side in FIG. 2, of the valve body 12 on the side opposite to the injection hole. When the movable core 15 is attracted by the stator core 14 and moves upward, the locking part 12d moves in the state of being locked to the movable core 15 and hence the valve body 12 also moves in response to the upward movement of the movable core 15. Even in the state of bringing the movable core 15 into contact with the stator core 14, the valve body 12 can move relatively to the movable core 15 and can lift up.

A main spring SP1 is arranged on the side of the valve body 12 opposite to the injection hole and a sub spring SP2 is arranged on the side of the movable core 15 closer to the injection hole 17a. The main spring SP1 and the sub spring SP2 are coil-shaped and deform resiliently in an axial direction. A resilient force of the main spring SP1 is given to the valve body 12 in the direction of valve closing that is the downward direction in FIG. 2 as a counter force coming from an adjustment pipe 101. A resilient force of the sub spring SP2 is given to the movable core 15 in the direction of attracting the movable core 15 as a counter force coming from a recess 11b of the body 11.

In short, the valve body 12 is interposed between the main spring SP1 and the valve seat 17b and the movable core 15 is interposed between the sub spring SP2 and the locking part 12d. Then the resilient force of the sub spring SP2 is transferred to the locking part 12d through the movable core 15 and is given to the valve body 12 in the direction of valve opening. It can also be said therefore that a resilient force obtained by subtracting a sub resilient force from a main resilient force is given to the valve body 12 in the direction of valve closing.

Here, the pressure of a fuel in the fuel passage 11a is applied to the whole surface of the valve body 12 but a force of pushing the valve body 12 toward the valve closing side is larger than a force of pushing the valve body 12 toward the valve opening side. The valve body 12 therefore is pushed by the fuel pressure in the direction of valve closing. During valve closing, the fuel pressure is not applied to the surface of a part of the valve body 12 located on the downstream side of the seat surface 12a. Then along with valve opening, the pressure of a fuel flowing into the tip part increases gradually and a force of pushing the tip part toward valve opening side increases. The fuel pressure in the vicinity of the tip part therefore increases in accordance with the valve opening and resultantly the fuel pressure valve closing force decreases. For the above reason, the fuel pressure valve closing force is maximum during valve closing and reduces gradually as the degree of the movement of the valve body 12 toward valve opening increases.

The behavior of the electromagnetic coil 13 by conduction is explained hereunder. When the electromagnetic coil 13 is conducted and an electromagnetic attraction force is generated in the stator core 14, the movable core 15 is attracted toward the stator core 14 by the electromagnetic attraction force. The electromagnetic attraction force is also called an electromagnetic force. As a result, the valve body 12 connected to the movable core 15 operates for valve opening against the resilient force of the main spring SP1 and the fuel pressure valve closing force. On the other hand, when the conduction of the electromagnetic coil 13 is stopped, the valve body 12 operates for valve closing together with the movable core 15 by the resilient force of the main spring SP1.

The configuration of the fuel injection control device 20 is explained hereunder. The fuel injection control device 20 is operated by an electronic control unit (called ECU for short). The fuel injection control device 20 includes a control circuit 21, a booster circuit 22, a voltage detection unit 23, a current detection unit 24, and a switch unit 25. The control circuit 21 is also called a microcomputer. The fuel injection control device 20 receives information from various sensors. For example, a fuel pressure supplied to the fuel injection valve 10 is detected by a fuel pressure sensor 31 attached to the delivery pipe 30 and the detection result is given to the fuel injection control device 20 as shown in FIG. 1. The fuel injection control device 20 controls the drive of the high-pressure pump 40 on the basis of the detection result of the fuel pressure sensor 31.

The control circuit 21 includes a central processing unit, a non-volatile memory (ROM), a volatile memory (RAM), and the like and calculates a requested injection quantity and a requested injection start time of a fuel on the basis of a load and a machine rotational speed of an internal combustion engine E. The storage mediums such as a ROM and a RAM are non-transitive tangible storage mediums to non-temporarily store programs and data that are readable by a computer. The control circuit 21: functions as an injection control unit; tests and stores an injection characteristic showing a relationship between a conduction time Ti and an injection quantity Q in the ROM beforehand; controls the conduction time Ti to the electromagnetic coil 13 in accordance with the injection characteristic; and thus controls the injection quantity Q. The control circuit 21 outputs an injection command pulse that is a pulse signal to command conduction to the electromagnetic coil 13 and the conduction time of the electromagnetic coil 13 is controlled by a pulse-on period (pulse width) of the pulse signal.

The voltage detection unit 23 and the current detection unit 24 detect a voltage and an electric current applied to the electromagnetic coil 13 and give the detection results to the control circuit 21. The voltage detection unit 23 detects a minus terminal voltage of the electromagnetic coil 13. When an electric current supplied to the electromagnetic coil 13 is intercepted, a flyback voltage is generated in the electromagnetic coil 13. Further, in the electromagnetic coil 13, an induced electromotive force is generated by intercepting the electric current and displacing the valve body 12 and the movable core 15 in the valve closing direction. In accordance with the turn-off of the conduction to the electromagnetic coil 13 therefore, a voltage of a value obtained by overlapping a voltage caused by the induced electromotive force to the flyback voltage is generated in the electromagnetic coil 13. It can accordingly be said that the voltage detection unit 23 detects the variation of an induced electromotive force caused by intercepting an electric current supplied to the electromagnetic coil 13 and displacing the valve body 12 and the movable core 15 toward the valve closing direction as a voltage value. Further, the voltage detection unit 23 detects the variation of an induced electromotive force caused by displacing the movable core 15 relatively to the valve body 12 after the valve seat 17b comes into contact with the valve body 12 as a voltage value. A valve closing detection unit 54 detects a valve closing timing when the valve body 12 shifts for valve closing by using a detected voltage. The valve closing detection unit 54 detects a valve closing timing for the fuel injection valve 10 in every cylinder.

The control circuit 21 has a charge control unit 51, a discharge control unit 52, a current control unit 53, the valve closing detection unit 54, an injection quantity estimation unit 55, and a current inclination detection unit 56. The booster circuit 22 and the switch unit 25 operate on the basis of an injection command signal outputted from the control circuit 21. The injection command signal is a signal to command a conduction state of the electromagnetic coil 13 in the fuel injection valve 10 and is set by using a requested injection quantity and a requested injection start time. In the present embodiment, the current inclination detection unit 56 corresponds to a detection unit.

The booster circuit 22 applies a boosted boost voltage to the electromagnetic coil 13. The booster circuit 22 has a booster coil, a condenser, and a switching element, a battery voltage applied from a battery terminal of a battery 102 is boosted by the booster coil, and the electricity is stored in the condenser. The voltage of the electric power boosted and stored in this way corresponds to a boost voltage.

When the discharge control unit 52 turns on a prescribed switching element so that the booster circuit 22 may discharge electricity, a boost voltage is applied to the electromagnetic coil 13 in the fuel injection valve 10. The discharge control unit 52 turns off the prescribed switching element in the booster circuit 22 when voltage application to the electromagnetic coil 13 stops.

The current control unit 53 controls on or off of the switch unit 25 and controls the electric current flowing in the electromagnetic coil 13 by using a detection result of the current detection unit 24. The switch unit 25 applies a battery voltage or a boost voltage from the booster circuit 22 to the electromagnetic coil 13 in an on state and stops the application in an off state. The current control unit 53, at a voltage application start time commanded by an injection command signal for example: turns on the switch unit 25; applies a boost voltage; and starts conduction. Then a coil current increases in accordance with the start of the conduction. When a coil current detection value is detected having reached a target value Ith (refer to FIGS. 8 and 9) on the basis of a detection result of the current detection unit 24, the current control unit 53 turns off conduction by a boosted voltage. In short, the current control unit 53 controls a coil current so as to be raised to the target value Ith by applying a boost voltage through initial conduction. Further, the current control unit 53 controls conduction by a battery voltage so that a coil current may be maintained at a value lower than the target value Ith after a boost voltage is applied.

Figure 3:
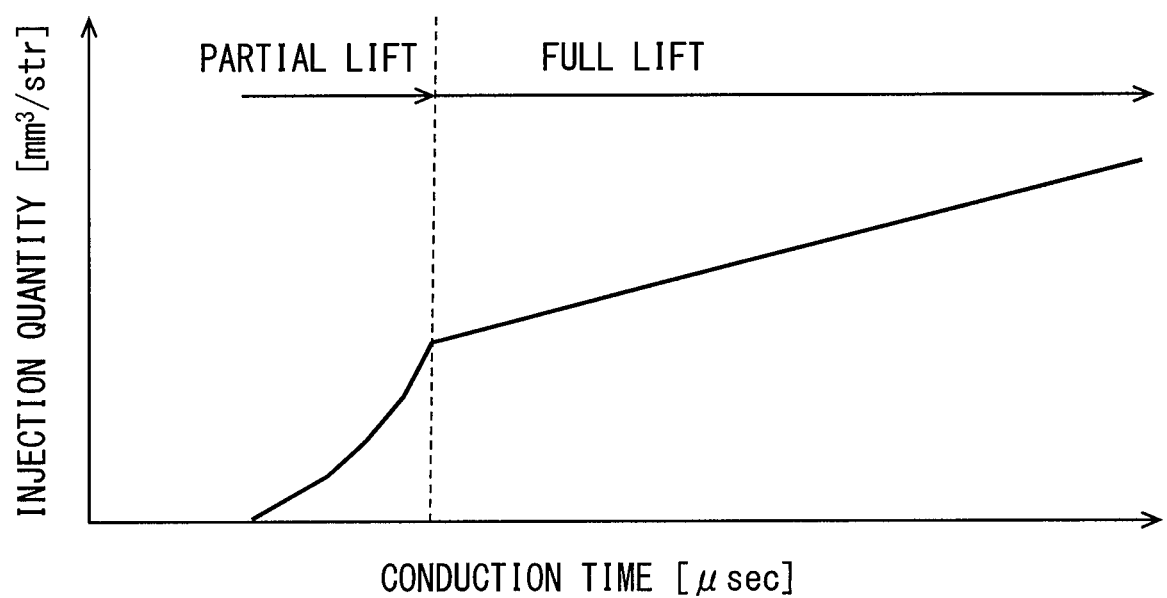
FIG. 3 is a graph showing a relationship between a conduction time and an injection quantity.

As shown in FIG. 3, an injection characteristic map representing a relationship between an injection command pulse width and an injection quantity is classified into a full lift region where an injection command pulse width is relatively large and a partial lift region where an injection command pulse width is relatively small. In the full lift region, the valve body 12: operates for valve opening until the lift quantity of the valve body 12 reaches a full lift position, namely a position where the movable core 15 abuts on the stator core 14; and stars operating for valve closing from the abutting position. In the partial lift region however, the valve body 12: operates for valve opening in a partial lift state where the lift quantity of the valve body 12 does not reach the full lift position, in other words to a position before the movable core 15 abuts on the stator core 14; and starts operating for valve closing from the partial lift position.

The fuel injection control device 20, in a full lift region, executes full lift injection of driving the fuel injection valve 10 for valve opening by an injection command pulse allowing the lift quantity of the valve body 12 to reach a full lift position. Further, the fuel injection control device 20, in a partial lift region, executes partial lift injection of driving the fuel injection valve 10 for valve opening by an injection command pulse causing a partial lift state where the lift quantity of the valve body 12 does not reach a full lift position.

Figure 4:
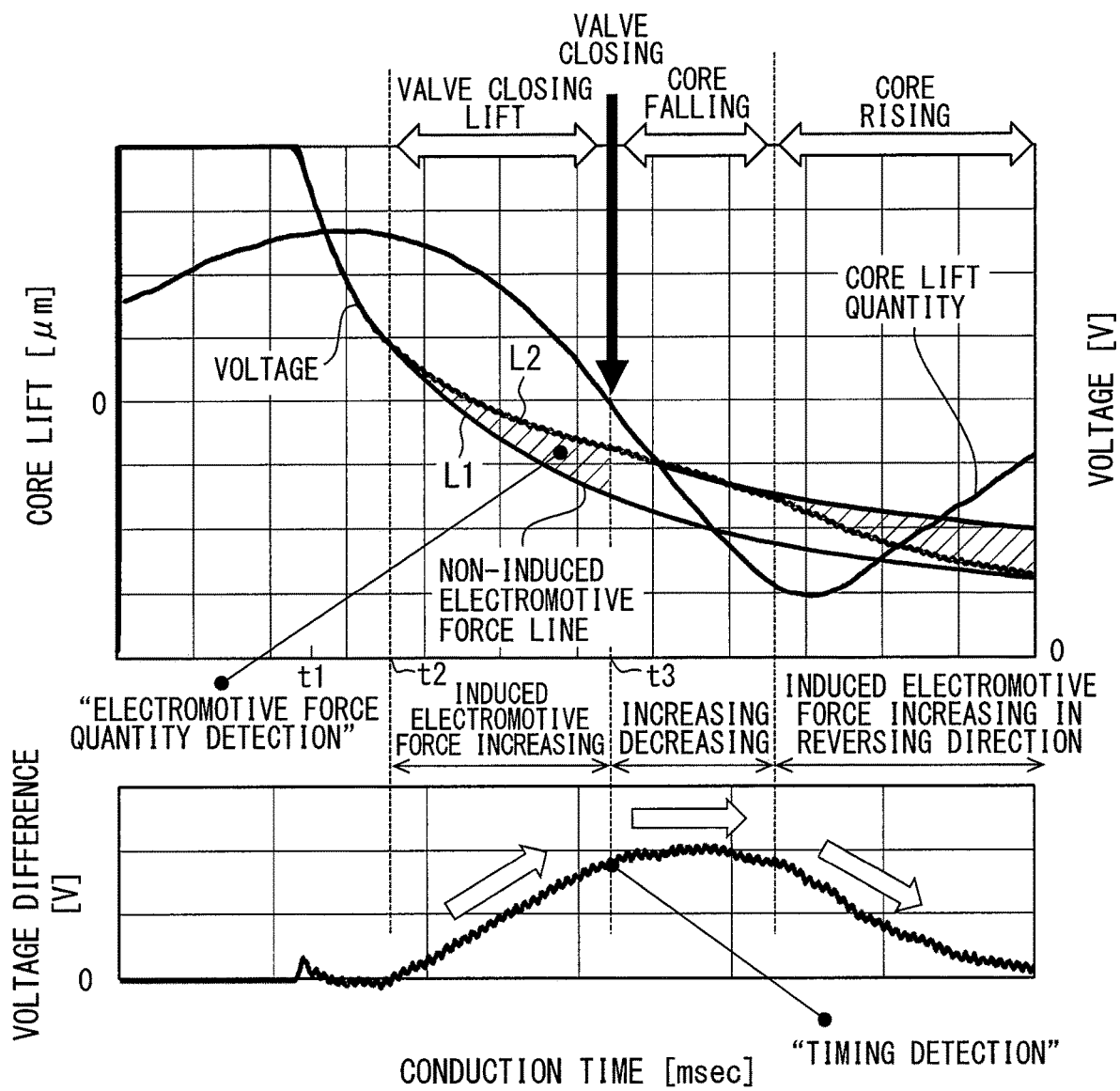
FIG. 4 is a graph showing the behavior of a valve body.

A detection mode of the valve closing detection unit 54 is explained hereunder in reference to FIG. 4. The graph at the upper part in FIG. 4 shows a waveform of minus terminal voltage of the electromagnetic coil 13 after conduction is switched from on to off and enlargedly shows a waveform of flyback voltage when conduction of the electromagnetic coil 13 is switched off. The flyback voltage is a negative value and hence is shown upside down in FIG. 4. In other words, a waveform of voltage obtained by reversing the positive and negative is shown in FIG. 4.

The valve closing detection unit 54 detects a physical quantity having a correlation with an injection quantity actually injected (actual injection quantity) during partial lift injection. The valve closing detection unit 54 has a timing detection unit 54a to detect a valve closing timing by a timing detection mode, an electromotive force quantity detection unit 54b to detect a valve closing timing by an electromotive force quantity detection mode, and a selection switch unit 54c to select and switch either of the detection modes. The valve closing detection unit 54 cannot detect a valve closing timing by both of the detection modes simultaneously and detects a valve closing timing when the valve body 12 shifts to valve closing by using either of the detection modes.

Firstly, an electromotive force quantity detection mode is explained.

Roughly, an electromotive force quantity detection mode is a mode of detecting a timing (integrated timing) when an integrated value of induced electromotive force reaches a prescribed quantity as a physical quantity having a correlation with an actual injection quantity. A timing when the valve body 12 is actually seated over the valve seat 17b for valve closing (actual valve closing timing) and an integrated timing are highly correlated. Then a timing when the valve body 12 separates actually from the valve seat 17b for valve opening (actual valve opening timing): is highly correlated with a conduction start timing; and hence can be regarded as a known timing. It can therefore be said that, as long as an integrated timing having a high correlation with an actual valve closing timing is detected, a period of time spent for actual injection (actual injection period) can be estimated and eventually an actual injection quantity can be estimated. In other words, it can be said that an integrated timing is a physical quantity having a correlation with an actual injection quantity.

Meanwhile, as shown in FIG. 4, minus terminal voltage varies by induced electromotive force after the time t1 when an injection command pulse is turned off. When a detected voltage waveform (refer to the symbol L1) is compared with a voltage waveform (refer to the symbol L2) in a virtual case where induced electromotive force is not generated, it is obvious that, in the detected voltage waveform, the voltage increases by the induced electromotive force shown with the oblique lines in FIG. 4. The induced electromotive force is generated when the movable core 15 passes through a magnetic field during the period from the start of valve closing operation to the completion of the valve closing.

Since the change rate of the valve body 12 and the change rate of the movable core 15 vary comparatively largely and the change characteristic of a minus terminal voltage varies at the valve closing timing of the valve body 12, the change characteristic of a minus terminal voltage varies in the vicinity of the valve closing timing. That is, the voltage waveform takes a shape of generating an inflection point (voltage inflection point) at a valve closing timing. Then a timing of generating a voltage inflection point is highly correlated with an integrated timing.

By paying attention to such a characteristic, the electromotive force quantity detection unit 54b detects a voltage inflection point time as information related to the integrated timing having a high relation with a valve closing timing as follows. The detection of a valve closing timing shown below is executed for each of the cylinders. The electromotive force quantity detection unit 54b calculates a first filtered voltage Vsm1 obtained by filtering (smoothing) a minus terminal voltage Vm of the fuel injection valve 10 with a first low-pass filter during the implementation of partial lift injection at least after an injection command pulse of the partial lift injection is switched off. The first low-pass filter uses a first frequency lower than the frequency of a noise component as the cut-off frequency. Further, the valve closing detection unit 54 calculates a second filtered voltage Vsm2 obtained by filtering (smoothing) the minus terminal voltage Vm of the fuel injection valve 10 with a second low-pass filter using a second frequency lower than the first frequency as the cut-off frequency. As a result, the first filtered voltage Vsm1 obtained by removing a noise component from a minus terminal voltage Vm and the second filtered voltage Vsm2 used for voltage inflection point detection can be calculated.

Figure 5:
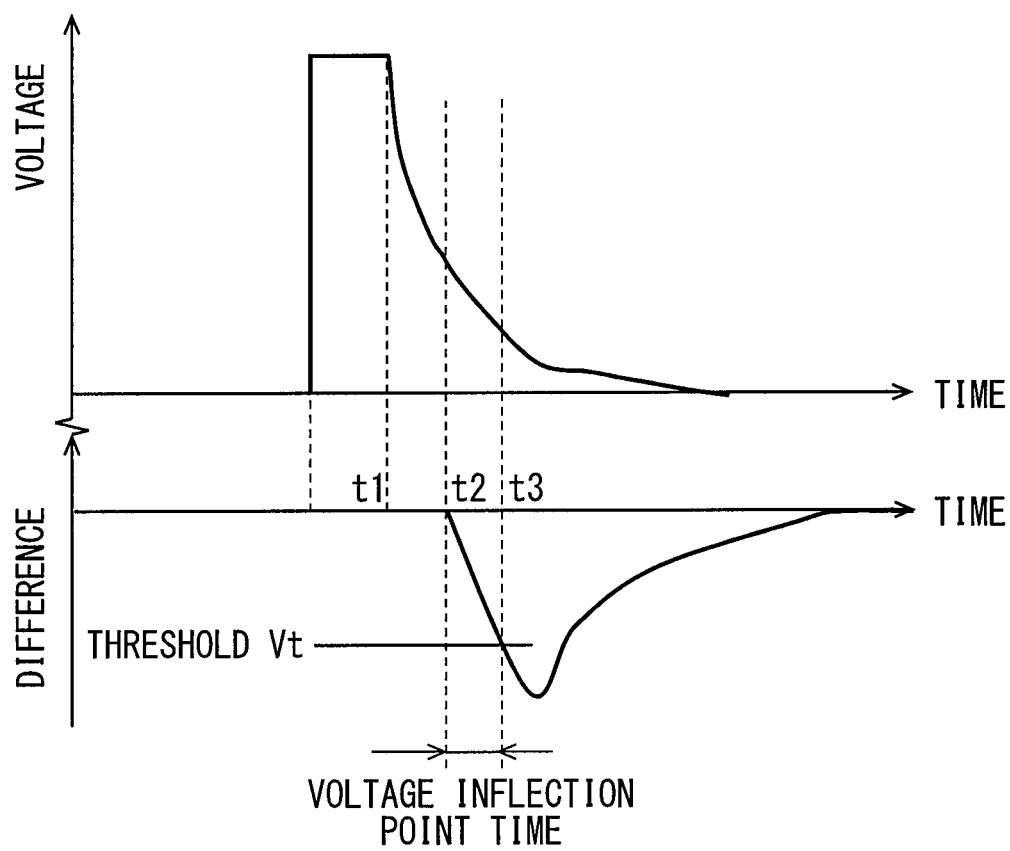
FIG. 5 is a graph showing a relationship between a voltage and a difference.

Further, the electromotive force quantity detection unit 54b calculates a difference Vdiff (=Vsm1−Vsm2) between the first filtered voltage Vsm1 and the second filtered voltage Vsm2. Furthermore, the valve closing detection unit 54 calculates a time from a prescribed reference timing to a timing when the difference Vdiff comes to be an inflection point as a voltage inflection point time Tdiff. On this occasion, as shown in FIG. 5, the voltage inflection point time Tdiff is calculated by regarding a timing when the difference Vdiff exceeds a prescribed threshold value Vt as a timing when the difference Vdiff comes to be an inflection point. In other words, a time from a prescribed reference timing to a timing when a difference Vdiff exceeds a prescribed threshold value Vt is calculated as the voltage inflection point time Tdiff. The difference Vdiff corresponds to an accumulated value of induced electromotive forces and the threshold value Vt corresponds to a prescribed reference quantity. The integrated timing corresponds to a timing where the difference Vdiff reaches the threshold value Vt. In the present embodiment, the voltage inflection point time Tdiff is calculated by regarding the reference timing as a time t2 when the difference is generated. The threshold value Vt is a fixed value or a value calculated by the control circuit 21 in response to a fuel pressure, a fuel temperature, and others.

In a partial lift region of the fuel injection valve 10, since an injection quantity varies and also a valve closing timing varies by the variation of a lift quantity of the fuel injection valve 10, there is a correlation between an injection quantity and a valve closing timing of the fuel injection valve 10. Further, since a voltage inflection point time Tdiff varies in response to the valve closing timing of the fuel injection valve 10, there is a correlation between a voltage inflection point time Tdiff and an injection quantity. By paying attention to such correlations, an injection command pulse correction routine is executed by the fuel injection control device 20 and hence an injection command pulse in partial lift injection is corrected on the basis of a voltage inflection point time Tdiff.

Secondly, a timing detection mode is explained.

Roughly, an electromotive force quantity detection mode is a mode of detecting a timing (integrated timing) when an integrated value of induced electromotive force reaches a prescribed quantity as a physical quantity having a correlation with an actual injection quantity. The timing detection unit 54a detects a timing when an increment of induced electromotive force per unit of time starts reducing as a valve closing timing.

The timing detection mode is explained hereunder. At a moment when the valve body 12 starts valve closing operation from a valve opening state and comes into contact with the valve seat 17b, since the movable core 15 separates from the valve body 12, the acceleration of the movable core 15 varies at the moment when the valve body 12 comes into contact with the valve seat 17b. In the timing detection mode, a valve closing timing is detected by detecting the variation of the acceleration of the movable core 15 as the variation of an induced electromotive force generated in the electromagnetic coil 13. The variation of the acceleration of the movable core 15 can be detected by a second-order differential value of a voltage detected by the voltage detection unit 23.

Specifically, as shown in FIG. 4, after the conduction to the electromagnetic coil 13 is stopped at the time t1, the movable core 15 switches from upward displacement to downward displacement in conjunction with the valve body 12. Then when the movable core 15 separates from the valve body 12 after the valve body 12 shifts to valve closing, a force in the valve closing direction that has heretofore been acting on the movable core 15 through the valve body 12, namely a force caused by a load by the main spring SP1 and a fuel pressure, disappears. A load of the sub spring SP2 therefore acts on the movable core 15 as a force in the valve opening direction. When the valve body 12 reaches a valve closing position and the direction of the force acting on the movable core 15 changes from the valve closing direction to the valve opening direction, the increase of an induced electromotive force that has heretofore been increasing gently reduces and the second-order differential value of a voltage turns downward at the valve closing time t3. By detecting the a timing where the second-order differential value of a minus terminal voltage becomes maximum by the timing detection unit 54a, a valve closing timing of the valve body 12 can be detected with a high degree of accuracy.

Similarly to the electromotive force quantity detection mode, there is a correlation between a valve closing time from the stop of conduction to a valve closing timing and an injection quantity. By paying attention to such a correlation, an injection command pulse correction routine is executed by the fuel injection control device 20 and thus an injection command pulse in partial lift injection is corrected on the basis of the valve closing time.

Figure 6:
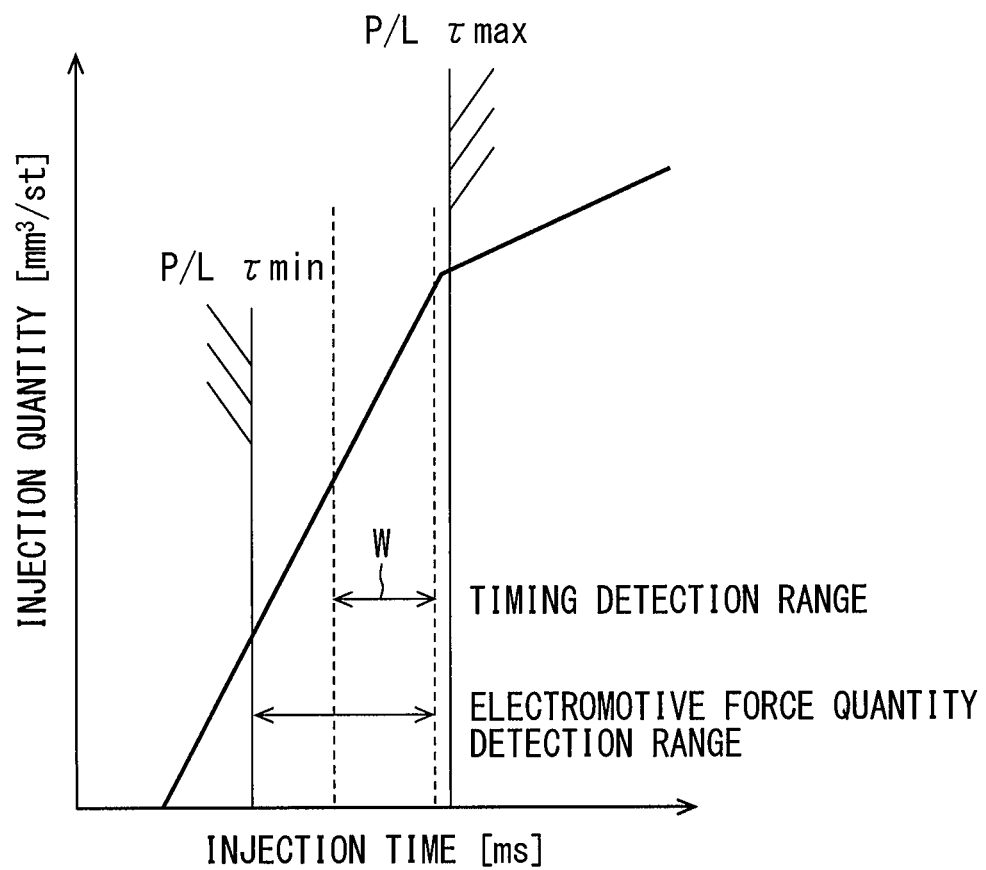
FIG. 6 is a graph for explaining a detection range.

As shown in FIG. 6, an injection time varies in response to a requested injection quantity. Then in a partial lift region, the detection range of the electromotive force quantity detection mode and the detection range W of the timing detection mode are different from each other. Specifically, the detection range W of the timing detection mode is located on the side where a required injection quantity is larger than a reference ratio in the partial lift region. The electromotive force quantity detection mode covers from a minimum injection quantity τmin to a value in the vicinity of a maximum injection quantity τmax. The detection range of the electromotive force quantity detection mode therefore includes the detection range W of the timing detection mode and is wider than the detection range W of the timing detection mode. The detection accuracy of a valve closing timing in the timing detection mode however is superior. In short, the present inventors have obtained the knowledge that the electromotive force quantity detection mode has a larger detection range than the timing detection mode and the timing detection mode has a higher degree of detection accuracy than the electromotive force quantity detection mode. On the basis of the knowledge, the selection switch unit 54c selects and switches either of the detection modes.

The injection quantity estimation unit 55 estimates an actual injection quantity on the basis of a detection result of the valve closing detection unit 54. For example, in the case of the timing detection mode, the injection quantity estimation unit 55 estimates an actual injection quantity on the basis of a detection result of the timing detection unit 54a, namely a timing when the second-order differential value of a minus terminal voltage comes to be the maximum. Specifically, a relationship among a timing when a second-order differential value comes to be the maximum, a conduction time, a supplied fuel pressure, and an actual injection quantity is stored as a timing detection map beforehand. Then the injection quantity estimation unit 55 estimates an actual injection quantity in reference to the timing detection map on the basis of a detection value of the timing detection unit 54a, a supplied fuel pressure detected by the fuel pressure sensor 31, and a conduction time.

Meanwhile, in the electromotive force quantity detection mode for example, the injection quantity estimation unit 55 estimates an actual injection quantity on the basis of a detection result of the electromotive force quantity detection unit 54b, namely a voltage inflection point time. Specifically, a relationship among a voltage inflection point time, a conduction time, a supplied fuel pressure, and an actual injection quantity is stored as an electromotive force quantity detection map beforehand. Then the injection quantity estimation unit 55 estimates an actual injection quantity in reference to the electromotive force quantity detection map on the basis of a detection value of the electromotive force quantity detection unit 54b, a supplied fuel pressure detected by the fuel pressure sensor 31, and a conduction time.

A processor included in the control circuit 21 executes learning processing that will be explained below. Through the learning processing, a learning value used at S11 in FIG. 7, namely an actual injection correction value that is a correction value to correct a requested injection quantity, is obtained. Specifically, an actual injection correction value for a requested injection quantity is calculated for learning on the basis of a deviation between an actual injection quantity estimated on the basis of a detection result of the valve closing detection unit 54 and an injection quantity corresponding to a command conduction time related to the actual injection, namely a corrected requested injection quantity. In the present embodiment, the ratio of a requested injection quantity to an actual injection quantity is defined as an actual injection correction value. Consequently, when an actual injection quantity is larger than a requested injection quantity, the actual injection correction value comes to be a value smaller than 1 in order to reduce the next requested injection quantity and, when an actual injection quantity is smaller than a requested injection quantity, the actual injection correction value comes to be a value larger than 1 in order to increase the next requested injection quantity.

Meanwhile, in view of the aforementioned knowledge shown in FIG. 6, the selection switch unit 54c switches to: a timing detection mode when a requested injection quantity is equal to or larger than a reference quantity; and an electromotive force quantity detection mode when a requested injection quantity is not equal to or larger than a reference quantity. As a result, the learning is executed: on the basis of an actual injection quantity estimated by a detection result of the timing detection unit 54a when a requested injection quantity is equal to or larger than a reference quantity; and on the basis of an actual injection quantity estimated by a detection result of the electromotive force quantity detection unit 54b when a requested injection quantity is not equal to or larger than a reference quantity.

The current inclination detection unit 56 detects a speed at which an electric current flowing in the electromagnetic coil 13 increases in accordance with the start of conducting the electromagnetic coil 13. The current increase speed corresponds to the inclination of the electric current waveform represented by the symbol ΔI in the electric current waveforms shown at the upper stage in either of FIGS. 8 and 9. Specifically, the current inclination detection unit 56: detects a time required from the start of conducting the electromagnetic coil 13 until an electric current reaches a prescribed value; and regards the required time as a current increase speed. The prescribed value is the target value Ith stated earlier that is used by the current control unit 53. In other words, the current inclination detection unit 56 detects a time required from the timing of turning on an injection command pulse until the current detection unit 24 detects that a coil current has reached the target value Ith.

Figure 7:
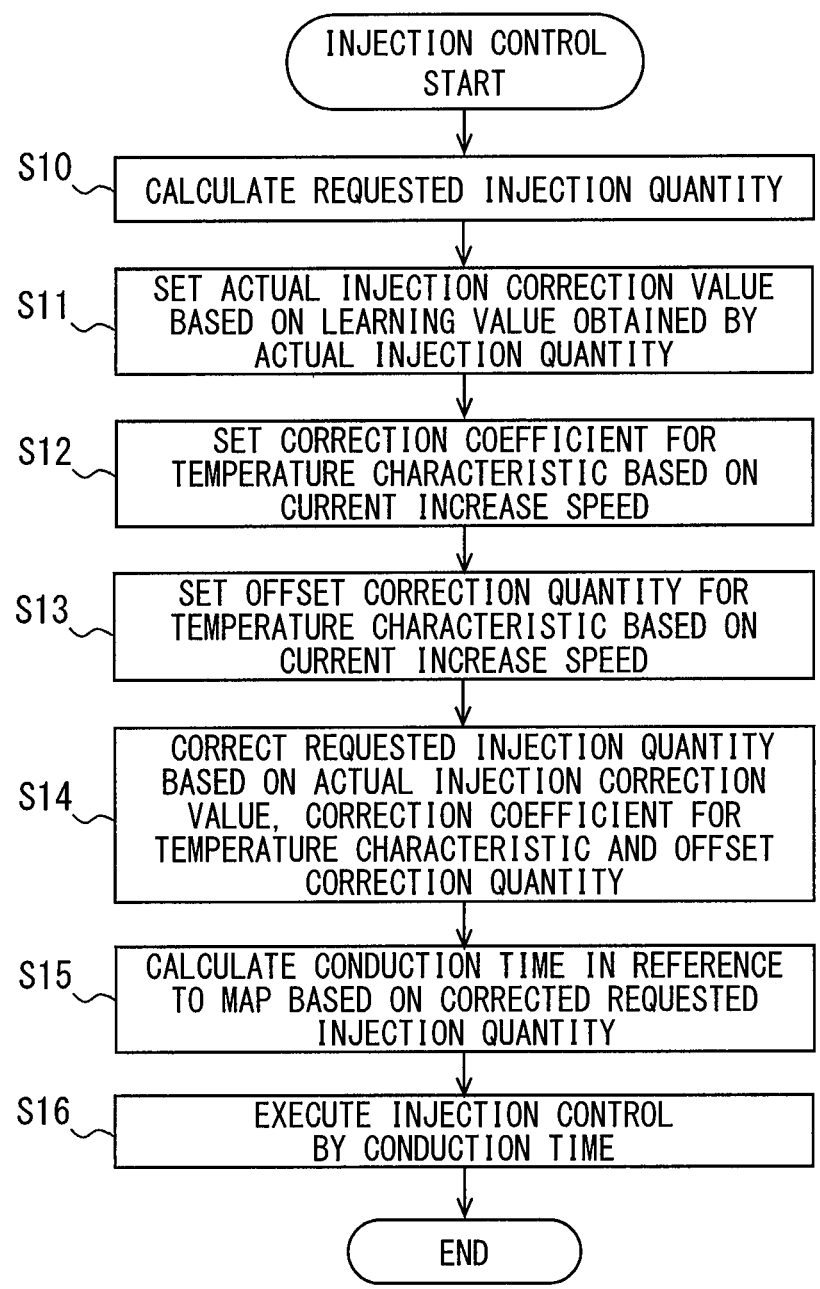
FIG. 7 is a flowchart showing injection control processing.

FIG. 7 is a flowchart showing the procedures through which a processor included in the control circuit 21 executes a program stored in a memory included in the control circuit 21 repeatedly in a prescribed cycle. In the processing of injection control shown in FIG. 7, firstly at S10, a requested injection quantity is calculated on the basis of a load and a machine rotational speed of an internal combustion engine E. At S11, an actual injection correction value for the requested injection quantity calculated at S10 is set by using a learning value obtained through the learning processing described earlier. Although a coefficient value by which the requested injection quantity is multiplied is set at an actual injection correction value and the requested injection quantity is corrected by multiplying the requested injection quantity by the actual injection correction value in the present embodiment, it is also possible to: set a deviation between an actual injection quantity and a requested injection quantity at an actual injection correction value; and correct the requested injection quantity by adding the actual injection correction value to or subtracting the actual injection correction value from the requested injection quantity.

At S12, a correction coefficient for a temperature characteristic (temperature characteristic correction coefficient) is set on the basis of a current increase speed detected by the current inclination detection unit 56. For example, a relationship between a current increase speed and a temperature characteristic correction coefficient is mapped and stored beforehand and a temperature characteristic correction coefficient is set on the basis of a current increase speed in reference to the correction coefficient map. Here, it is also possible to: make a correction coefficient map beforehand by being associated with a supplied fuel pressure to the fuel injection valve 10 in addition to the current increase speed; and set a temperature characteristic correction coefficient on the basis of a current increase speed and a supplied fuel pressure in reference to the correction coefficient map.

At S13, an offset correction quantity for a temperature characteristic is set on the basis of a current increase speed detected by the current inclination detection unit 56. For example, a relationship between a current increase speed and a temperature characteristic offset correction quantity is mapped and stored beforehand and a temperature characteristic offset correction quantity is set on the basis of a current increase speed in reference to the offset correction quantity map. Here, it is also possible to: make an offset correction quantity map beforehand by being associated with a supplied fuel pressure in addition to the current increase speed; and set a temperature characteristic offset correction quantity on the basis of a current increase speed and a supplied fuel pressure in reference to the offset correction quantity map.

At S14, the requested injection quantity calculated at S10 is corrected by an actual injection correction value, a temperature characteristic correction coefficient, and a temperature characteristic offset correction quantity set at S11, S12, and S13. Specifically, the requested injection quantity is corrected by multiplying the requested injection quantity by an actual injection correction value and a temperature characteristic correction coefficient and adding a temperature characteristic offset correction quantity to the requested injection quantity.

Here, an injection characteristic map representing a relationship between a conduction time and an injection quantity is stored in the control circuit 21 beforehand. Then at S15, a conduction time corresponding to the corrected requested injection quantity calculated at S14 is calculated in reference to the injection characteristic map. As the injection characteristic map, a plurality of maps are stored in response to supplied fuel pressures detected by the fuel pressure sensor 31 and a conduction time is calculated in reference to an injection characteristic map corresponding to a supplied fuel pressure of every moment. At S16, the electromagnetic coil 13 is conducted on the basis of a conduction time calculated at S15. Specifically, a pulse width of an injection command pulse is set as the length of a calculated conduction time.

Meanwhile, the control circuit 21 during the processes of S12 and S13 corresponds to a correction value calculation unit to calculate a correction value for a requested injection quantity on the basis of a current increase speed. In particular, the control circuit 21 during the process of S13 corresponds to an offset correction quantity calculation unit to calculate an offset correction quantity as a correction value and the control circuit 21 during the process of S12 corresponds to a correction coefficient calculation unit to calculate a correction coefficient as a correction value. Further, the control circuit 21 during the process of S15 corresponds to a conduction time calculation unit to calculate a conduction time of the electromagnetic coil 13 corresponding to a requested injection quantity.

Figure 8:
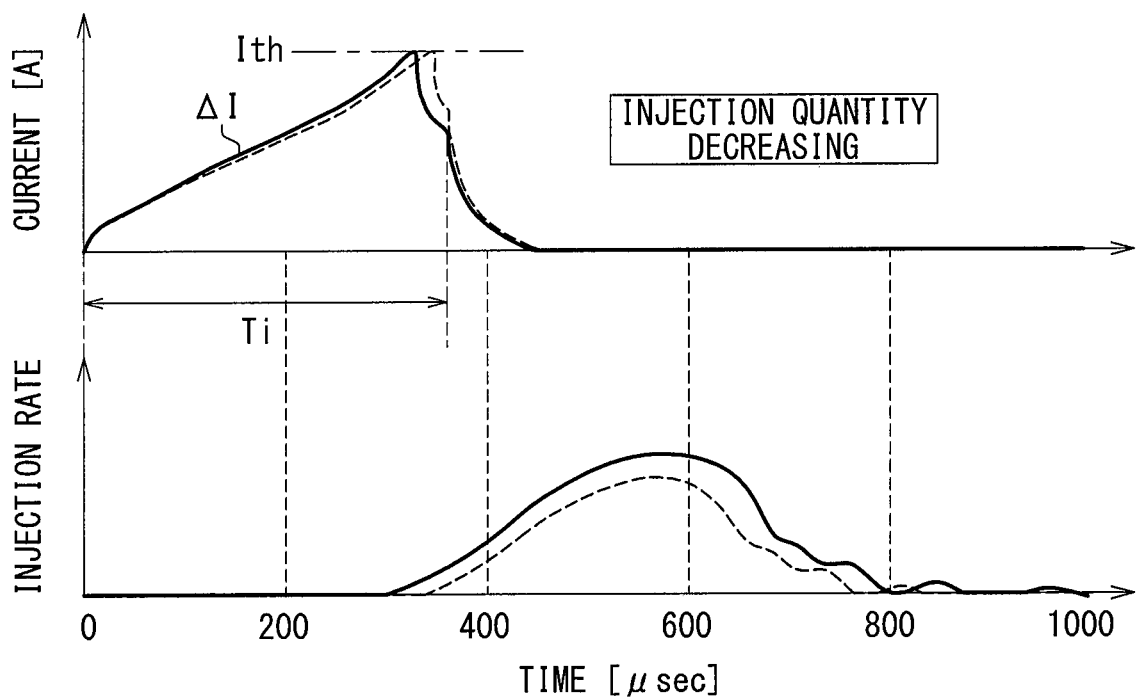
FIG. 8 is a graph showing the variations of a coil current and an injection rate with the lapse of time in partial injection and also is a graph showing an example of the case where an injection quantity decreases because an electric resistance increases by high temperature.
Figure 9:
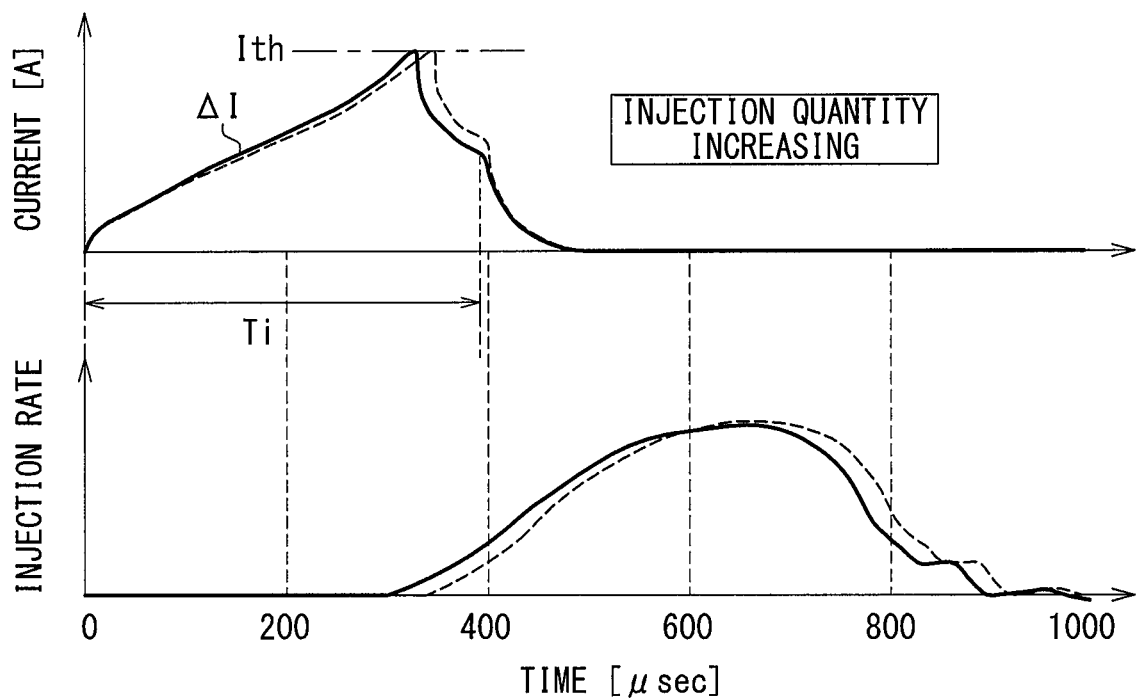
FIG. 9 is a graph showing the variations of a coil current and an injection rate with the lapse of time in partial injection and also is a graph showing an example of the case where an injection quantity increases because an electric resistance increases by high temperature.
Figure 10:
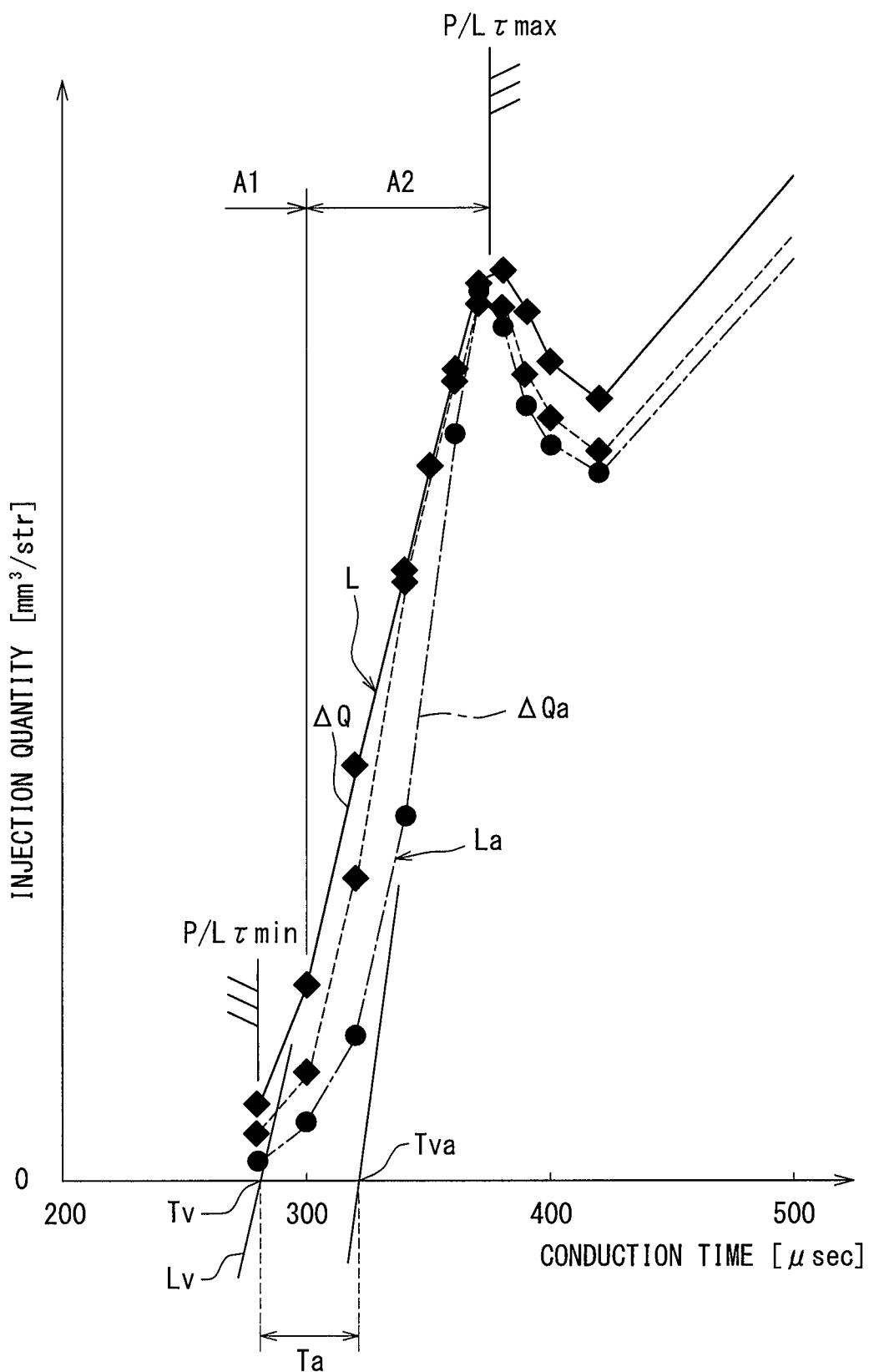
FIG. 10 is a graph showing the variation of an injection characteristic responding to temperature.

Technical significance of correcting a requested injection quantity by a temperature characteristic offset correction quantity and a temperature characteristic correction coefficient is explained hereunder in reference to FIGS. 8, 9, and 10.

An increase speed of a coil current immediately after the start of conduction varies in response to a temperature of the electromagnetic coil 13. As a result, an injection characteristic changes as stated earlier. In FIGS. 8 and 9, the solid lines show electric current waveforms and injection rate waveforms during ordinary temperature and the dotted lines show electric current waveforms and injection rate waveforms during high temperature. The injection rate means a quantity injected through the injection hole 17a per unit of time. Then a value obtained by integrating injection rates, namely an area surrounded by an injection rate waveform and a horizontal axis, shows an injection quantity during one time valve opening.

In the example shown in FIG. 8, an injection quantity is smaller during high temperature than during ordinary temperature. The reason is that it takes time to increase an attraction force to the extent of starting valve opening operation because the inclination ΔI of an electric current waveform reduces during high temperature and hence a valve opening start time delays. On the other hand, in the example shown in FIG. 9, the conduction time Ti is slightly longer than the case of FIG. 8. Then in the example of FIG. 9, an injection quantity is larger during high temperature than during ordinary temperature. The reason is that an energy loss caused by the generation of eddy current is small because the inclination ΔI of an electric current waveform reduces during high temperature and the valve opening speed of the valve body 12 is high. For the reason, although a valve opening start time delays during high temperature, since the valve opening speed is high, if a conduction time Ti is equal to or longer than a prescribed time, the area of an injection rate waveform increases in comparison with during low temperature and an injection quantity increases.

In short, whereas a valve opening start time delays and an invalid injection period from the start of conduction to the start of valve opening operation increases during high temperature, the loss of electric energy supplied to the electromagnetic coil 13 reduces during the high temperature. As a result, as shown in FIG. 10, when a conduction time Ti is equal to or longer than a prescribed time, an injection quantity is larger during the high temperature shown by the long dashed short dashed line and the dotted line than during the ordinary temperature shown by the solid line. When a conduction time Ti is shorter than a prescribed time however, an injection quantity is smaller during the high temperature shown by the long dashed short dashed line and the dotted line than during the ordinary temperature shown by the solid line. Here, FIG. 10 is an example of the case where a supplied fuel pressure is 20 MPa and the electric resistance of the electromagnetic coil 13 is larger: by 0.25Ω in the case of the dotted line than in the case of the solid line; and by 0.75Ω in the case of the long dashed short dashed line than in the case of the solid line.

Here, an injection characteristic line L includes a first region A1 where the inclination of the injection characteristic line L increases gradually in proportion to the increase of a conduction time and reaches a prescribed inclination and a second region A2, the second region being a region on the side where the conduction time is longer than the first region A1, where the inclination of the injection characteristic line L forms a constant straight line. For example, the inclination of the injection characteristic line L during ordinary temperature in the second region A2 is set at ΔQ and the inclination of the injection characteristic line La during high temperature in the second region A2 is set at ΔQa. The ratio of the inclination ΔQa during high temperature to the inclination ΔQ during ordinary temperature corresponds to a temperature characteristic correction coefficient. As stated earlier, because an energy loss reduces as a temperature rises, as shown in FIG. 10, the inclination ΔQa during high temperature is larger than the inclination ΔQ during ordinary temperature. That is, a temperature characteristic correction coefficient is set at a higher value as a temperature rises.

Then since the inclination of an injection characteristic line in the second region and a current increase speed are highly correlated with each other, a relationship between the inclination of an injection characteristic line in the second region and a current increase speed can be obtained beforehand by experiment and the inclination of the injection characteristic line is used as a temperature characteristic correction coefficient. Otherwise, a temperature characteristic correction coefficient is obtained by adding a prescribed constant to the above inclination or multiplying the above inclination by a prescribed coefficient. The correction coefficient map stated earlier therefore is made on the basis of the above experimental result.

Further, the injection characteristic line in the second region A2 has the shape of a straight line having a constant inclination and the value of the conduction time when the injection quantity is zero on a virtual straight line Lv formed by extending the straight line is defined as a virtual time Tv. The virtual time Tv corresponds to the invalid injection period stated earlier. A value obtained by multiplying a time difference Ta between a virtual time Tv during ordinary temperature and a virtual time Tva during high temperature by a prescribed coefficient corresponds to a temperature characteristic offset correction quantity. As stated earlier, because an invalid injection period increases as a temperature rises, as shown in FIG. 10, the virtual time Tva during high temperature is longer than the virtual time Tv during ordinary temperature. That is, a temperature characteristic offset correction quantity is set at a higher value as a temperature rises.

Then since a virtual time Tva that is an invalid injection period and a current increase speed are highly correlated with each other, a relationship between a virtual time Tva and a current increase speed can be obtained beforehand by experiment and a temperature characteristic offset correction quantity is calculated on the basis of the virtual time Tva. For example, the difference of the virtual time Tva from a virtual time Tv during ordinary temperature is used as a temperature characteristic offset correction quantity. Otherwise, a temperature characteristic offset quantity is obtained by adding a prescribed constant to the above difference or multiplying the above difference by a prescribed coefficient. The offset correction quantity map stated earlier therefore is made on the basis of the above experimental result.

In short, a first phenomenon of reducing energy loss as a temperature rises is reflected on a temperature characteristic correction coefficient and a second phenomenon of increasing an invalid injection period as a temperature rises is reflected on a temperature characteristic offset correction quantity. The first phenomenon is to increase an injection quantity as a temperature rises and the second phenomenon is to reduce an injection quantity as a temperature rises. Such two kinds of phenomena conflicting with each other are sorted into a temperature characteristic offset correction quantity and a temperature characteristic correction coefficient respectively and then reflected as correction values.

As explained above, in the present embodiment, the current inclination detection unit 56 to detect a current increase speed during partial lift injection, a correction value calculation unit at S12 and S13, and a conduction time calculation unit at S15 are provided. The correction value calculation unit calculates a correction value for a requested injection quantity on the basis of a detected current increase speed and the conduction time calculation unit calculates a conduction time during partial lift injection on the basis of the requested injection quantity corrected by the correction value. Then since the change of an injection characteristic responding to a temperature is highly correlated with a current increase speed, according to the present embodiment, control can be executed by a conduction time suitable for an injection characteristic varying in response to a temperature during partial lift injection. A fuel injection quantity in partial lift injection therefore can be controlled with a high degree of accuracy.

In the present embodiment further, the correction value calculation unit has an offset correction quantity calculation unit at S13 and a correction coefficient calculation unit at S12. The offset correction quantity calculation unit calculates an offset correction quantity to correct a requested injection quantity by adding the offset correction quantity to or subtracting the offset correction quantity from the requested injection quantity on the basis of a current increase speed. The correction coefficient calculation unit calculates a correction coefficient to correct a requested injection quantity by multiplying the requested injection quantity by the correction coefficient on the basis of a current increase speed. According to this, as described earlier in reference to FIGS. 8 to 10, two kinds of phenomena are sorted into a temperature characteristic offset correction quantity and a temperature characteristic correction coefficient respectively and then reflected as correction values. As a result, a fuel injection quantity in partial lift injection can be controlled with a yet higher degree of accuracy. In particular, although an injection characteristic varies largely depending on the kind of the fuel injection valve 10, even when an injection characteristic varies largely by the difference of machine types, control can be executed likewise with a high degree of accuracy and the robustness of control against the difference of injection characteristics by machine types can be improved.

In the present embodiment furthermore, the correction coefficient calculation unit calculates a temperature characteristic correction coefficient on the basis of an inclination $\Delta Qa$ of an injection characteristic line La in a second region A2 estimated from a correlation with a current increase speed. As a result, the degree of the first phenomenon of reducing energy loss as a temperature rises stated earlier is reflected on a temperature characteristic correction coefficient and hence the accuracy of correcting a requested injection quantity can be improved.

In the present embodiment yet further, a value of a conduction time when an injection quantity is zero on a virtual straight line Lv formed by extending the straight line of an injection characteristic line L in a second region A2 is defined as a virtual time Tv. Then an offset correction quantity calculation unit calculates a temperature characteristic offset correction quantity on the basis of a virtual time Tv estimated from a correlation with a current increase speed. As a result, the degree of the second phenomenon of increasing an invalid injection period as a temperature rises stated earlier is reflected on a temperature characteristic offset correction quantity and hence the accuracy of correcting a requested injection quantity can be improved.

In the present embodiment moreover, the current inclination detection unit 56 obtains a current increase speed by detecting a time required from the start of conducting the electromagnetic coil 13 until an electric current flowing in the electromagnetic coil 13 reaches a prescribed value (for example, a target value Ith). According to this, a current increase speed is obtained by using information that is used for the current control unit 53 to control the conduction state of the electromagnetic coil 13 and is information on whether or not a coil current has reached a target value Ith. As a result, a current increase speed can be obtained without using a circuit used exclusively for calculating a correction value and hence the circuit configuration of a fuel injection control device can be simplified.

Here, as stated earlier, the timing detection mode and the induced electromotive force detection mode have advantages and disadvantages respectively. It is desirable therefore to detect a valve closing timing simultaneously by both of the detection modes. In order to make it possible to execute both of the detection modes simultaneously however, the processing capability of the control circuit 21 has to be enhanced and the implementation scale of the fuel injection control device 20 may increase undesirably. In view of this point, the valve closing detection unit 54 according to the present embodiment has the timing detection unit 54a of the timing detection mode, the electromotive force quantity detection unit 54b of the induced electromotive force detection mode, and the selection switch unit 54c to select and switch either of the detection modes. Consequently, the valve closing detection unit 54 can switch so as to exhibit the advantages of both of the modes and can be downsized further than a configuration of executing both of the modes simultaneously.

(Other Embodiments)

The embodiment of the present disclosure has been described with reference to specific examples. However, the present disclosure is not limited to these specific examples. That is, ones obtained by modifying the design of these specific examples as appropriate by a person skilled in the art are also included in the scope of the present disclosure as long as they have the characteristics of the present disclosure.

In the first embodiment stated above, the current inclination detection unit 56 obtains a current increase speed by detecting a time from the start of conducting the electromagnetic coil 13 until a coil current reaches a prescribed value. In place of the detection mode, it is also possible to obtain a current increase speed by detecting a current increase quantity from the start of conducting the electromagnetic coil 13 until a prescribed time lapses.

In the first embodiment stated above, a temperature characteristic correction coefficient and a temperature characteristic offset correction quantity are calculated individually on the basis of a current increase speed and a requested injection quantity is corrected by the temperature characteristic correction coefficient and the temperature characteristic offset correction quantity respectively. On the other hand, it is also possible to: calculate either a correction coefficient for multiplication or a correction quantity for addition on the basis of a current increase speed; and correct a requested injection quantity by a calculated correction coefficient or correction quantity.

Although the fuel injection valve 10 is configured so as to have the valve body 12 and the movable core 15 individually in the first embodiment stated earlier, the fuel injection valve 10 may also be configured so as to have the valve body 12 and the movable core 15 integrally. If they are configured integrally, the valve body 12 is displaced together with the movable core 15 in the valve opening direction and shifts to valve opening when the movable core 15 is attracted.

Although the fuel injection valve 10 is configured so as to start the shift of the valve body 12 at the same time as the start of the shift of the movable core 15 in the first embodiment stated earlier, the fuel injection valve 10 is not limited to such a configuration. For example, the fuel injection valve 10 may be configured so that: the valve body 12 may not start valve opening even when the movable core 15 starts shifting; and the movable core 15 may engage with the valve body 12 and start valve opening at the time when the movable core 15 moves by a prescribed distance.

Although the voltage detection unit 23 detects a minus terminal voltage of the electromagnetic coil 13 in the first embodiment stated above, a plus terminal voltage or a voltage across terminals between a plus terminal and a minus terminal may also be detected.

In the first embodiment stated above, the valve closing detection unit 54 detects a terminal voltage of the electromagnetic coil 13 as a physical quantity having a correlation with an actual injection quantity. Then the injection quantity estimation unit 55 estimates an actual injection quantity by estimating a valve closing timing on the basis of a waveform representing the change of the detected voltage. In contrast, an actual injection quantity may be estimated also by detecting a supplied fuel pressure as a physical quantity having a correlation with the actual injection quantity and estimating a valve closing timing on the basis of a waveform representing the change of the detected fuel pressure. Otherwise, an actual injection quantity may be estimated also on the basis of a waveform representing the change of an engine speed by detecting the engine speed as a physical quantity having a correlation with the actual injection quantity.

The functions exhibited by the fuel injection control device 20 in the first embodiment stated earlier may be exhibited by hardware and software, those being different from those stated earlier, or a combination of them. The control device for example may communicate with another control device and the other control device may implement a part or the whole of processing. When a control device includes an electronic circuit, the control device may include a digital circuit or an analog circuit including many logic circuits.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A fuel injection control device that is applied to a fuel injection valve including a valve body to open and close an injection hole to inject a fuel and an electric actuator that has an electromagnetic coil and a movable core to move by being attracted by an electromagnetic force generated by conducting the electromagnetic coil and operates the valve body for valve opening, the fuel injection control device to control a valve opening time of the valve body by controlling a conduction time of the electromagnetic coil and thus control an injection quantity injected per one time valve opening of the valve body, the fuel injection control device comprising:

a detection unit to detect a current increase speed that is a speed of increasing an electric current flowing in the electromagnetic coil in accordance with the start of conducting the electromagnetic coil during partial lift injection in which the valve body starts valve closing operation before the valve body reaches a maximum valve opening position after the valve body starts valve opening operation;

a correction value calculation unit to calculate a correction value for a requested injection quantity that is the injection quantity required on the basis of the current increase speed detected by the detection unit; and a conduction time calculation unit to calculate the conduction time of the electromagnetic coil during the partial lift injection on the basis of the requested injection quantity corrected by the correction value.

2. The fuel injection control device according to claim 1, wherein the correction value calculation unit includes an offset correction quantity calculation unit to calculate an offset correction quantity to correct the requested injection quantity by adding the offset correction quantity to or subtracting the offset correction quantity from the requested injection quantity on the basis of the current increase speed, and a correction coefficient calculation unit to calculate a correction coefficient to correct the requested injection quantity by multiplying the requested injection quantity by the correction coefficient on the basis of the current increase speed.

3. The fuel injection control device according to claim 2, wherein
an injection characteristic line representing a relationship between the conduction time and the injection quantity in the partial lift injection includes a first region where the inclination of the injection characteristic line increases gradually in proportion to the increase of the conduction time and reaches a prescribed inclination, and a second region, the second region being a region on the side where the conduction time is longer than the first region, where the inclination of the injection characteristic line forms a constant straight line, and
the correction coefficient calculation unit calculates the correction coefficient on the basis of the inclination of the injection characteristic line in the second region estimated from a correlation with the current increase speed.

4. The fuel injection control device according to claim 2, wherein
an injection characteristic line representing a relationship between the conduction time and the injection quantity in the partial lift injection includes a first region where the inclination of the injection characteristic line increases gradually in proportion to the increase of the conduction time and reaches a prescribed inclination, and a second region, the second region being a region on the side where the conduction time is longer than the first region, where the inclination of the injection characteristic line forms a constant straight line,
a value of the conduction time when the injection quantity is zero on a virtual straight line formed by extending the straight line is defined as a virtual time, and
the offset correction quantity calculation unit calculates the offset correction quantity on the basis of the virtual time estimated from a correlation with the current increase speed.

5. The fuel injection control device according to claim 1, wherein
the detection unit obtains the current increase speed by detecting a time required from the start of conducting the electromagnetic coil until an electric current flowing in the electromagnetic coil reaches a prescribed value.

* * * * *